(12) United States Patent  
Chu et al.

(10) Patent No.: US 8,792,499 B2  
(45) Date of Patent: Jul. 29, 2014

(54) APPARATUS AND METHOD FOR SCHEDULING ON AN OPTICAL RING NETWORK

(75) Inventors: Thomas P. Chu, Englishtown, NJ (US); Ahmet A. Akyamac, Bridgewater, NJ (US); Huseyin Uzunalioglu, Millington, NJ (US); John E. Simsarian, New York, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 662 days.

(21) Appl. No.: 12/985,108

(22) Filed: Jan. 5, 2011

(65) Prior Publication Data

US 2012/0170932 A1     Jul. 5, 2012

(51) Int. Cl.  
     *H04L 12/28*     (2006.01)
(52) U.S. Cl.  
     USPC .......................................... 370/395.4; 398/45
(58) Field of Classification Search  
     None  
     See application file for complete search history.

(56) References Cited

U.S. PATENT DOCUMENTS

| | | | | |
|---|---|---|---|---|
| 7,061,929 | B1 * | 6/2006 | Eberle et al. ................... | 370/423 |
| 7,474,853 | B2 * | 1/2009 | Best et al. ........................ | 398/51 |
| 2002/0118421 | A1 * | 8/2002 | Xiong et al. .................... | 359/140 |
| 2004/0208548 | A1 * | 10/2004 | Gruber et al. .................... | 398/50 |
| 2004/0213564 | A1 * | 10/2004 | Sakano et al. ................... | 398/12 |
| 2005/0226156 | A1 * | 10/2005 | Keating et al. ................. | 370/235 |
| 2006/0092853 | A1 * | 5/2006 | Santoso et al. ................. | 370/252 |
| 2006/0146697 | A1 * | 7/2006 | Magret et al. .................. | 370/219 |
| 2006/0165081 | A1 * | 7/2006 | Benner et al. .................. | 370/390 |
| 2006/0171717 | A1 * | 8/2006 | Kikuchi .......................... | 398/83 |
| 2007/0110438 | A1 * | 5/2007 | Su et al. .......................... | 398/45 |
| 2007/0237521 | A1 * | 10/2007 | Meyer et al. .................... | 398/19 |
| 2008/0124081 | A1 * | 5/2008 | Hamada et al. ................. | 398/59 |
| 2009/0080885 | A1 * | 3/2009 | Mehrotra et al. ............... | 398/48 |
| 2009/0285097 | A1 * | 11/2009 | So et al. ......................... | 370/235 |
| 2011/0080846 | A1 * | 4/2011 | He et al. ......................... | 370/254 |
| 2011/0158658 | A1 * | 6/2011 | Myslinski et al. ............. | 398/208 |
| 2013/0039651 | A1 * | 2/2013 | Sadananda et al. ............. | 398/26 |

OTHER PUBLICATIONS

Davik, F. et al., "IEEE 802.17 Resilient Packet Ring Tutorial", IEEE Communications Magazine, vol. 42(3): pp. 112-118, Mar. 2004.

* cited by examiner

*Primary Examiner* — Phirin Sam  
(74) *Attorney, Agent, or Firm* — Andy Ralston (57) ABSTRACT

An example method includes receiving at a scheduling server status information concerning at least one transmit queue for a plurality of optical pass-through switches (OptSws). A schedule for transmissions to take place is determined based on the status information for the OptSws. A control message is forwarded to the plurality of OptSws in order that the schedule may be implemented. In an embodiment, a schedule is determined for a wavelength available to transmit a transmission by removing unsupportable transmissions from a candidate transmission list, determining a first transmission that is the one of the transmissions of the candidate transmission list which most preferably satisfies a given parameter, updating a usage list to reflect determination of the first transmission; and replacing the candidate transmission list with the residue set of the first transmission. The usage list reflects transmissions determined by the scheduler.

22 Claims, 8 Drawing Sheets

Figure 1

Prior Art

Figure 2

Prior Art

APPARATUS AND METHOD FOR SCHEDULING ON AN OPTICAL RING NETWORK

FIELD OF INVENTION

This invention relates to scheduling for a ring network, and in particular to apparatuses and methods for scheduling on an optical ring network.

DESCRIPTION OF RELATED ART

Ring based optical networks have existed for a significant period of time. The ANSI T1X1.5 committee began work on SONET (Synchronous Optical Network) in 1985. ITU (then CCITT) started work on the SDH (Synchronous Digital Hierarchy) suites of standards in 1986. The SONET/SDH standards are closely aligned and can be considered as in the same standard family.

Figure 1:
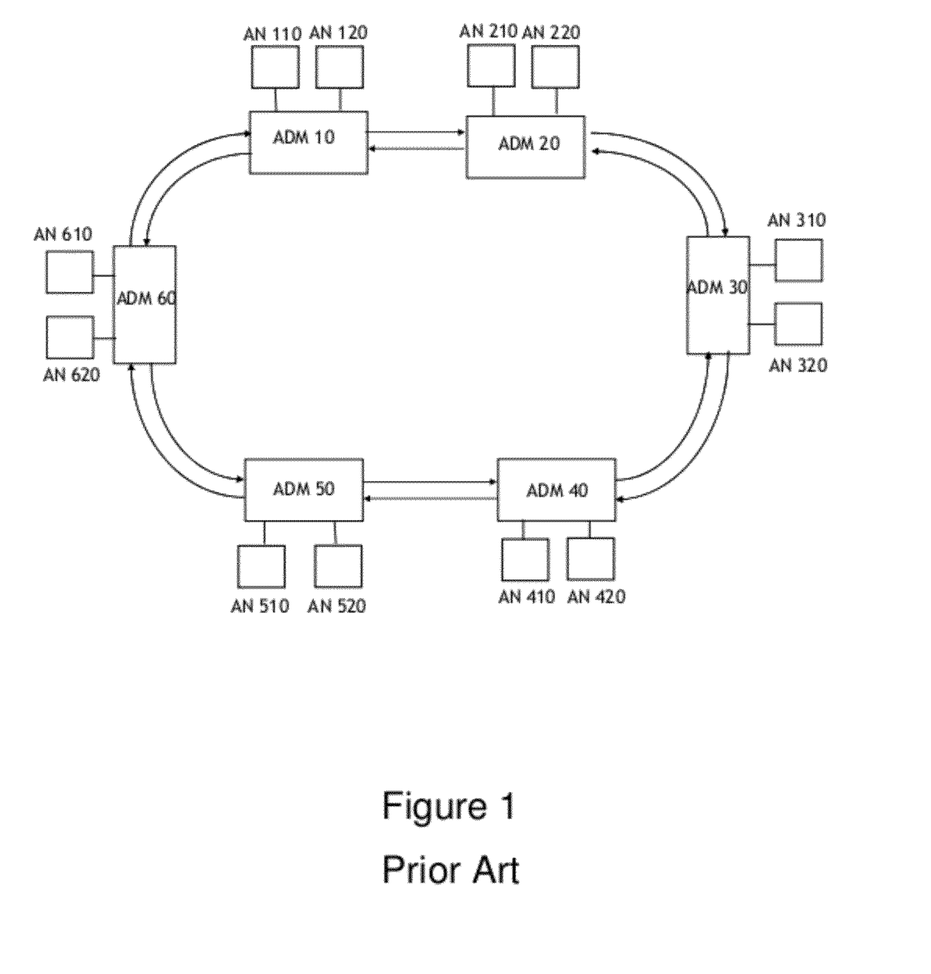
FIG. 1 is an illustration of an example prior art SONET/SDH network.

In SONET/SDH, network nodes, usually referred to as add/drop multiplexers (ADM), are connected in a ring topology. FIG. 1 is an illustration of an example SONET/SDH network. In FIG. 1, ADM 10, 20, 30, . . . , 60 are connected in a ring topology. The ring network may include two or more ADM. Connected to an ADM are one or more access nodes (AN). An add/drop multiplexers will receive traffic from a corresponding access node (e.g., AN 110 at ADM 10) and insert the traffic onto the ring. Similarly, an ADM will remove traffic destined to one of its connected ANs (e.g., AN 120 at ADM 10) from the ring and forward the traffic to its destination. While only two AN are illustrated connected to an ADM, any number of AN may be so connected.

In FIG. 1, multiple traffic streams may be illustrated. For example, there may be two traffic streams: (1) a data stream from AN 510 to AN 110 and (2) a data stream from AN 120 to AN 210. Note that data stream (1) passes through ADM 60 transparently. Traffic between different nodes is multiplexed onto the same transmission link using time division multiplexing (TDM).

With the pre-dominance of packet based applications, a new class of packet based ring networks began to appear in the early 2000's which culminated in the IEEE 802.17 Resilient Packet Ring (RPR) standard. RPR also has a ring topology. However, RPR's basic data units in transport are packets and its multiplexing scheme is statistical multiplexing. As transport of packets is its native mode, RPR is more efficient for the transport of packets such as Ethernet frames and IP packets than SONET/SDH.

Optical ring networks remain popular for a variety of reasons including (1) their simple topology, and (2) their automated recovery from single failure of the network.

Both SDH/SONET multiplexers as well as packet based optical switches demodulate an incoming optical signal, process the data in the electronic domain (e.g., add and drop data), and then modulate the resulting data back to optical signal to be transmitted to the next node. This optical-electronic-optical conversion introduces a number of concerns, including: a) the number of modulators and demodulators (e.g., associated cost and complexity); b) the energy consumption required by these modulators and demodulators; and c) processing delay. Because of these and other concerns, a new class of optical switches has been proposed. These proposed optical switches are still connected in a ring topology. However, for these optical switches, an incoming optical signal will not be de-modulated unless that signal contains data that is destined for the switch; otherwise, the incoming optical signal will just pass through the switch. This class of optical switches will be referred to herein as optical pass-through switches (OptSw).

Figure 2:
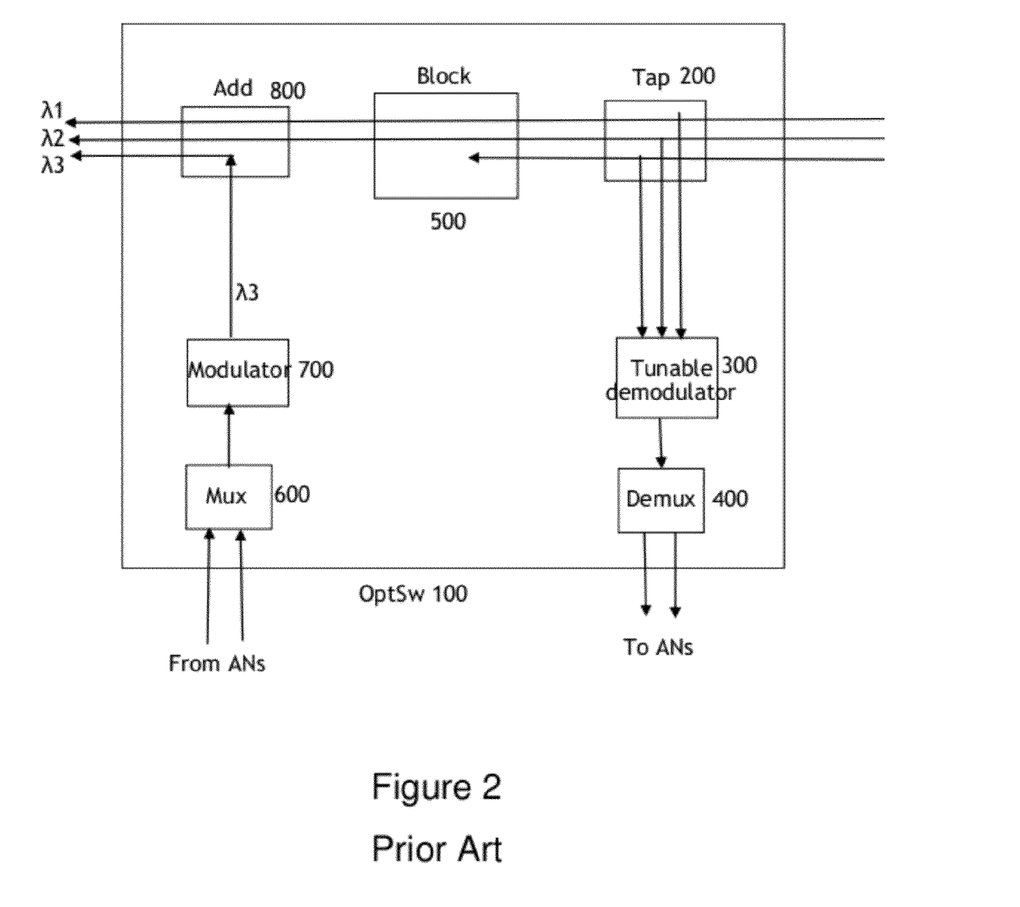
FIG. 2 is an illustration of the high level architecture of a prior art Optical Pass-through Switch (OptSw)

Operation of an example OptSw switch is illustrated in FIG. 2. In FIG. 2, signal wavelengths (e.g., $\lambda 1, \lambda 2,$ and $\lambda 3$) are received at OptSw 100 at tap module 200. The tap module splits the incoming signals into two branches. One branch terminates at one or more modulators 300, which may be tunable de-modulators 300, and which demodulate any signal that is destined for ANs associated with the OptSw 100. The OptSw may also include a demultiplexer (Demux) 400 to separate the demodulated signal so individual ones of the resultant separated signals may be provided to ANs associated with the OptSw 100. The other branch from tap module 200 proceeds to a blocking module 500. Normally, all the optical signal passes through blocking module 500 unmodified. However, if OptSw 100 has the privilege to transmit at a particular wavelength, that wavelength will be blocked at the blocking module 500 so that the received signal at that particular wavelength will not interfere with the signal that may be transmitted by OptSw node 100. In FIG. 2, as an illustrative example, $\lambda 3$ is blocked.

Unblocked optical signals are passed to add module 800. At the OptSw node 100 are also a number of modulators 700. If the OPtSw has the privilege to transmit at a particular wavelength, the OptSw will modulate the data and pass the resultant modulated signal to add-module 800. A plurality of signals from a plurality of ANs may be combined by multiplexer (Mux) 600 prior to being modulated onto a channel by modulator 700. Add-module 800 combines one or more wavelengths from the modulator 700 and passthrough wavelengths from the blocking module 500 and forwards all these optical signals to the next OptSw in the optical ring network. In one embodiment, the transmitter at OptSw is a tunable transmitter which can transmit optical signals at a wide range of wavelengths. For cost reasons, the transmitters may be fixed wavelength transmitters; however, the flexibility of the system is greatly reduced if this is the case.

One skilled in the art can readily observe that, with this architecture, the number of the transmitters and receivers at an OptSw may be greatly reduced. Also, the transmitters and receivers need not active all the time but only need to be active when data is added or removed from the OptSw respectively. This insight can lead to a savings in energy.

SUMMARY

An example method includes receiving at a scheduling server status information concerning at least one transmit queue for a plurality of optical pass-through switches (OptSws). A schedule for transmissions to take place is determined based on the status information for the OptSws. A control message is forwarded to the plurality of OptSws in order that the schedule may be implemented. In an embodiment, a schedule is determined for a wavelength available to transmit a transmission by removing unsupportable transmissions from a candidate transmission list, determining a first transmission that is the one of the transmissions of the candidate transmission list which most preferably satisfies a given parameter, updating a usage list to reflect determination of the first transmission; and replacing the candidate transmission list with the residue set of the first transmission. The method may be reiterated to schedule additional transmission on the wavelength under consideration and/or multiple wavelengths. The usage list reflects transmissions determined by the scheduler. Based on the usage list, the scheduler can provide appropriate control massages to implement dropping, blocking, and adding of wavelength at the plurality of OptSws in a network so as to receive and/or transmit data to/from an access node associated with an OptSw.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 3:
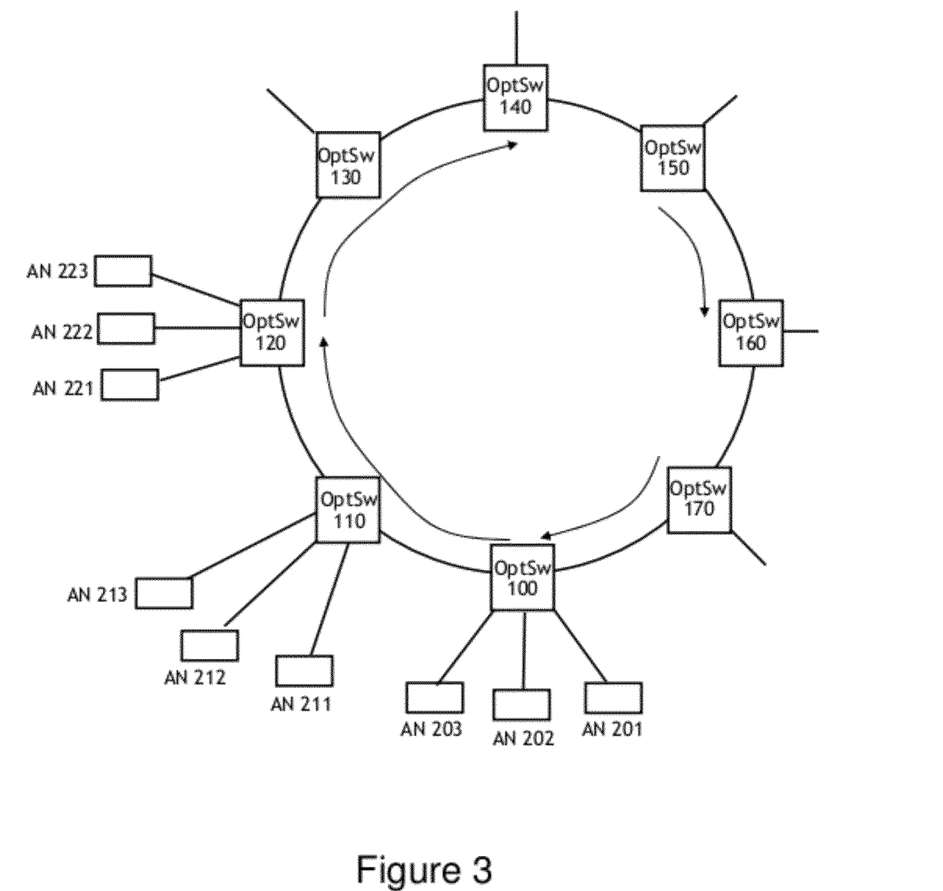
FIG. 3 is an illustration of space re-use in ring networks; according to the principles of the invention

One challenge for optical networking is the design of a scheduler for the transmitters and receivers at the individuals OptSw nodes in the network; that is, determining when a node is to transmit data and when a node is to receive data. Accordingly, provided herein are apparatuses and methods for scheduling a ring network Toward that end, consider the example network of FIG. 3 for an illustration of space re-use according to the principles of the invention. In FIG. 3, OptSw 100, 110, 120, ... 170 are arranged in a ring topology. Attached to the OptSw are a number of access nodes (AN), which may be one or more in number. For simplicity, three ANs are shown attached to each OptSw 100, 110, and 120 in the figure. In this example, only consider a single wavelength $\lambda 1$ operating in the clockwise direction. As illustrated by the arrow in FIG. 3, OptSw 100 is transmitting at $\lambda 1$ to OptSw 120. In this case, OptSw 110, being in the transmission path between OptSw 100 and 120, operates in pass through mode for $\lambda 1$ (i.e., neither transmitting nor receiving data).

Further considering FIG. 3, when OptSw 100 is transmitting to OptSw 120, OptSw 120 could transmit to OptSw 140. At the same time, OptSw 150 could transmit to OptSw 160, and OptSw 170 could transmit to OptSw 100. The property that multiple non-overlapping transmissions for the wavelength occur simultaneously over a wavelength is referred to as space reuse.

Figure 4:
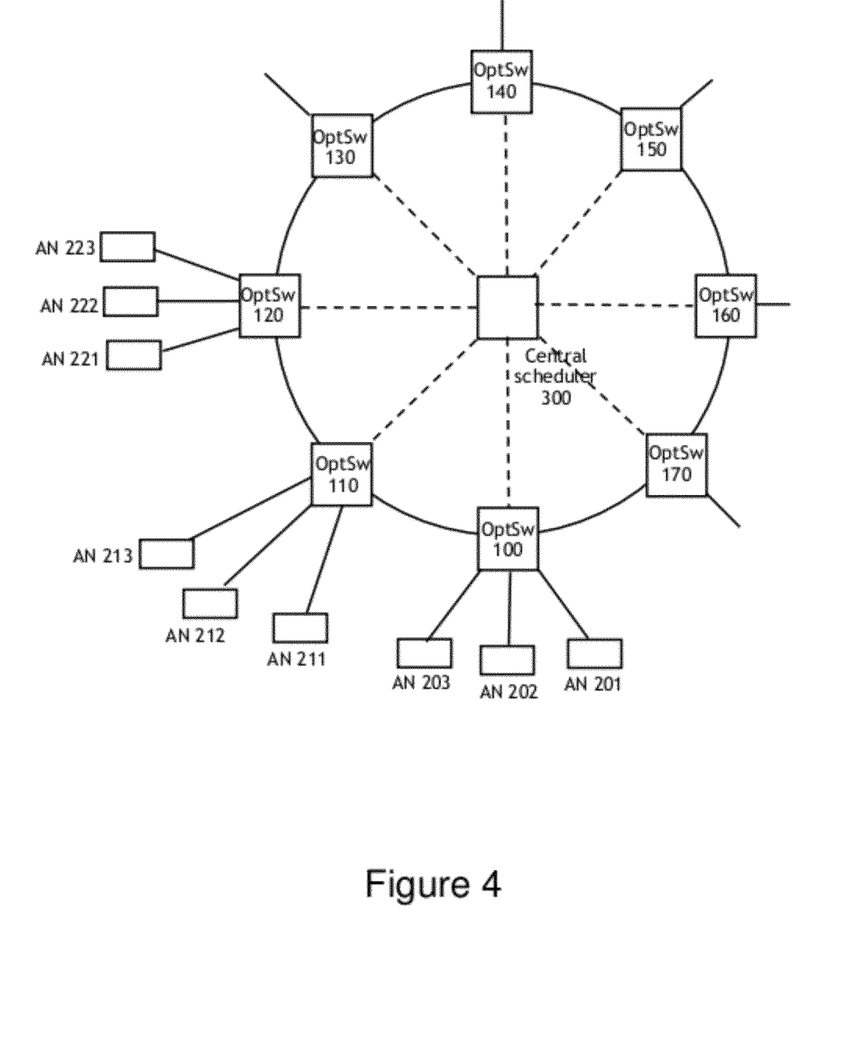
FIG. 4 is an illustration of an example network architecture according to one embodiment of the invention.

Methods, apparatuses and architecture for the scheduling of transmissions on an OptSw ring network, employing space-reuse, are provided. An illustrative network according to one embodiment of the invention is presented in FIG. 4 in which OptSw 100, 110, 120, ..., 170 are connected in a ring topology. Connected to each OptSw are a number of access nodes (AN). In FIG. 4, AN 201, 202, and 202 are connected to OptSw 100; AN 211, 212, and 213 are connected to OptSw 110; AN 221, 222, and 223 are connected to OptSw 120. To simplify the figure, ANs attached to other OptSw are not shown in the figure and, only three ANs are shown for those OptSw with AN though other numbers of AN are contemplated. The OptSws of the network are logically connected to central scheduler or scheduling module 300. The central scheduler need not be located geographically central to the OptSws.

The OptSws are connected by one or more optical fibers. Wavelength divisional multiplexing (WDM) may be used so that each fiber supports multiple wavelengths $\lambda 1$, $\lambda 2$, $\lambda 3$, ..., $\lambda n$. Each OptSw node-pair may be connected using the same number of fibers and the same set of $\lambda$s. Between two nodes, some of the fibers are user to transmit in one direction (e.g., clockwise in Figure), while the rest are used to transmit in the other, opposite direction (e.g., counter-clockwise in the Figure).

In one embodiment, the OptSw network provides for the transport of layer 2 data packets between the ANs. An OptSw will accept a layer 2 data packet from an ingress AN and forward the data packet to an appropriate egress AN through the OptSw network. The most dominant layer 2 packet standard is Ethernet and example embodiments will be describes assuming that the layer 2 packets are Ethernet frames. Note however that other layer 2 packet standards such as Internet Protocol and other or proprietary implementations may be utilized for layer 2 packet transport.

Using the pass through capability of OptSws in an optical network, a first OptSw can establish direct optical connection to another OptSw in the network. In addition, each OptSw may include a packet forwarding module. The packet modules of the OptSws are connected together to form a packet network. The packet network is used to transfer between the OptSw traffic including: user traffic such as broadcast, multicast, narrowcast or unicast traffic; packets where the identifier information (ID) of the egress OptSw is not known; packets where the ID of the egress OptSw is known; and control packets. At least 2 wavelengths, one in each direction, are committed to support the transfer of layer 2 packets between the packet forwarding modules at each OptSw, hop by hop.

Figure 5:
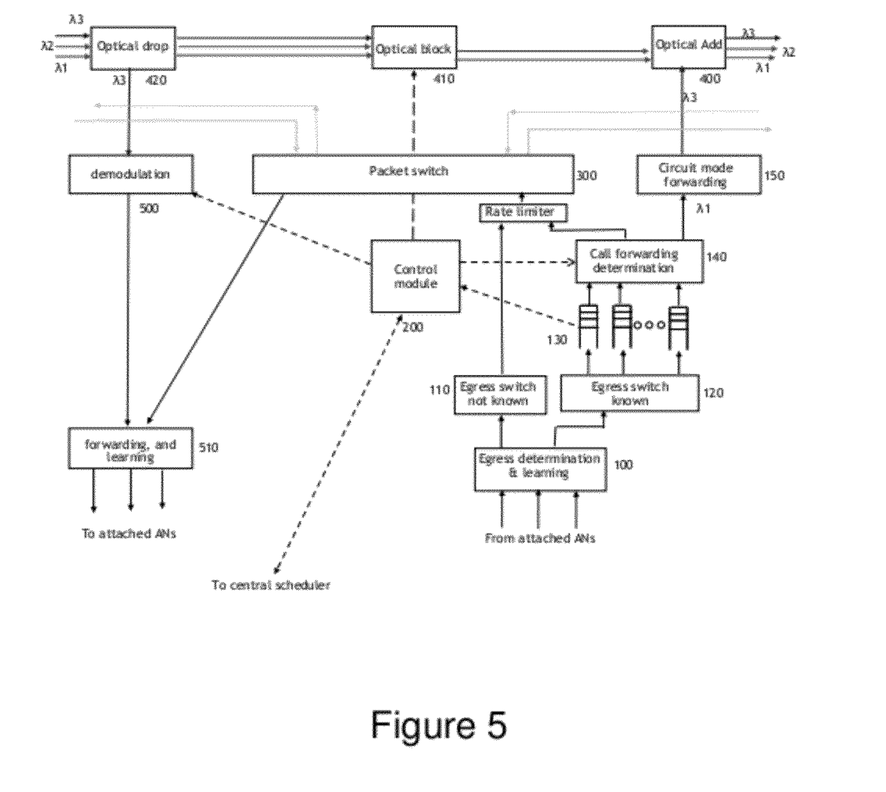
FIG. 5 is an illustration of an example logical architecture of an OptSw node according to one embodiment.

An example architecture for an OptSw node according to one embodiment of the invention is illustrated in FIG. 5. Ethernet packets from ANs associated with an OptSw are received at egress determination and learning module 100 where one or more of the following functions are performed:

Learning: An OptSw maintains a forwarding table. Each entry of the table may include the MAC address of a device and the identity of the OptSw that the device is attached to. In addition, if the device is attached to the local OptSw, the entry would also identify the interface that the device is attached to. Thus, when an Ethernet packet arrives via an interface (e.g., interface n) of the OptSw, the egress determination and learning module 100 first examines the MAC address of the originating device (e.g., MAC address A) from the source address field of the Ethernet packet. The module 100 then updates the forwarding table to indicate that the device is locally attached (e.g., MAC address A is locally attached at interface n.)

Egress node determination: Module 100 examines the destination MAC address of the incoming packet and attempts to determine, based on the forwarding table, the egress OptSw (i.e., the OptSw that the destination device is attached to).

If the forwarding table does not contain an entry for the destination address (i.e., the identity of the egress OptSw is not known) or if the packet is a multicast/broadcast packet, module 100 will forward the packet to egress switch not known module 110, where the packet will be queued (queue not shown) waiting to be broadcasted to all other OptSws through the packet network.

If the OptSw can determine the identity of the egress OptSw from the forwarding table, module 100 will forward the packet to egress switch known module 120 which will place the packet in the appropriate queue 130 for transmission to the egress OptSw. Logically, there is a single queue to for each destination OptSw. In implementation, all the logical queues may share the same physical queue.

The queues report their status to the control module 200 from time to time. In one embodiment, queue status may be report at regular and/or frequent intervals. In one embodiment, the status information includes at least one of the following information: queue length, and time of arrivals for the head of queue packets. In turn, control module 200 reports queue status to the central scheduler (FIG. 4: 300) from time to time. This information may also be reported to the central scheduler at regular and/or frequent intervals. When reporting to the central scheduler, the reported information is not limited to only raw information that may be reported by the queues to control module 200; such reported information may also include derived information. For example, as a transmit queue may report its queue length to control module 200 at regular frequent intervals, the control module 200 may estimate the incoming data rate for a particular queue. Based on this estimation, control module 200 may estimate a time that the buffer will overflow if no data is being transmitted from this particular queue or based on the transmission rate of the queue. This buffer overflow time estimation is but one example of derived information that may be included in the information reported to the central scheduler. Furthermore, instead of reporting detailed statistical information to the central scheduler (e.g., number of bytes for queue size), thresholds may be set up for each parameter of the status information of interest, and control module may only report the value of the threshold for the parameter.

The central scheduler may also send commands to the OptSw instructing operation of the OptSw, for example whether, the OptSw should receive data (or stop receiving) for a particular wavelength; the OptSw should transmit (or stop transmitting) data to another OptSw using a particular wavelength, and duration of operation information (e.g., for how long to transmit/receive). Note that an OptSw may have multiple receivers and transmitters, and thus may transmit and receive at multiple wavelengths at the same time.

Based on the instructions from the central scheduler, control module 200 sets the various components of the OptSw to enable (or terminate) the ability to transmit and/or receive data. In FIG. 5, as an example, the OptSw is instructed to transmit and receive at λ3. Thus, a demodulator 500 is set to demodulate the signal at λ3. At the same time, the command module also sends a command to call forwarding determination module 140, instructing it to transmit data from the queue/s 130 to egress OptSw as indicated in the instruction from the central processor). Alternatively the command module may instruct transmission of data from the broadcast queue 115. Since the OptSw is transmitting at λ3, the control module also instructs the blocking module 410 to block λ3.

When a first OptSw (e.g., OptSw A) receives data from a second OptSw (e.g., OptSw B) through direct optical transmissions, a wavelength may be dropped by optical drop 420 and the demodulated packets from demodulation module 500 will be forwarded to forwarding and learning module 510. The forwarding and learning module 510 is configured to examine the source address of the packets and updates the forwarding table accordingly. For example, if the source address field contains MAC address X, module 510 will update the forwarding table to indicate that MAC address X is attached to OptSw B. The packets are then forwarded to the appropriate AN.

The packet switch modules 300 of the OptSws, illustrated in FIG. 5, are connected to form a packet based ring network. A multicast packet or one with unknown egress OptSw is queued at module 110. Eventually, it will be broadcasted to the rest of the OptSws using either packet mode or circuit mode as explained further below.

The packet switch module may also used to send a limited amount of other packets (e.g., a unicast packet with known egress OptSw) from the queues 130. However, to avoid overloading the packet network, a rate limiter 310 may be implemented to limit the rate of traffic that can be injected into the packet network. There are many methods of implementing the rate limiter 310. For example, a well known method is the "token" bucket algorithm.

In one embodiment, the packet based ring network connecting the packet switch modules of all the OptSw would have its own layer-2 protocol (referred to as the native layer-2 protocol). Ethernet packets from the ANs are encapsulated within this native layer-2 protocol. In another embodiment, the native layer-2 protocol between the packet switch modules is Ethernet and users' Ethernet packets are encapsulated in the native Ethernet packet.

The header of the native Ethernet may be encoded as follows:

the source address field is encoded with the Ethernet address of the ingress OptSw;

if the payload is a user packet where the egress OptSw is not known, the destination address field is encoded with the all broadcast Ethernet address. If the egress OptSw of the payload packet is known, then the destination address field is encoded with the Ethernet address of the egress OptSw; and the Payload type field is encoded according to the type of packets encapsulated in the native layer-2 protocol.

Correspondingly, when the forwarding and learning module 510 receives a packet from the packet switch, it should update the forwarding table accordingly:

the source address field of the inner Ethernet indicates the MAC address of the source device; and the source address of the outer Ethernet (i.e., the native layer-2 header) indicates the MAC address of the ingress OptSw (i.e., the OptSw where the source device is attached).

In the above description, it is assumed that all packets are of equal priority. Embodiments of the invention can be easily extended to support packets with different priority. One embodiment implementing this priority extension assigns to different queues packets with different priority even if the packets of differing priority are destined to the same egress OptSw. Then the priority of queues may be additionally consulted to determine the ordering of packet transmission. For example, higher priority packets could be transmitted first for any particular egress OptSw.

Scheduling by the central server depends on the information and/or statistics provided by the OptSws. In one embodiment, each OptSw sends one or more the following information to the central scheduler:

the size of the current buffer for each transmission queue;

the estimate time of buffer overflow for each queue if the input rate of the queue does not change;

the queuing delay of the head of queue packet;

the average delay of all the packets in the queue; and the current size of the buffer.

Each applicable parameter may be judged against a set of thresholds so as to determine a priority for each queue as pertains to the parameter. As an example for buffer size, thresholds may be established 60%, 85%, 95% capacity respectively. If the buffer size is over 95% capacity, the priority of this queue may be set as priority 1 as far as buffer-size parameter is concerned. If the buffer size is between 85% and 95%, the priority may be set as priority 2, and so on, etc.

Similarly, thresholds may be established for other parameters, such as overflow time estimate and head of queue delay, and parameter specific priority may be assigned to each queue. A final or overall priority for a queue may be a function of all the parameter specific priorities (e.g., the highest priority of all the parameter specific priorities, a weighted sum of all the parameter specific priorities, etc.).

Associated with each queue at a first OptSw (e.g., OptSw A or node A) is a possible transmission, from OptSw A to another OptSw (e.g., OptSw B or node B). We will use the term "transmission" (e.g., from node A to node B) to describe the transfer of data from one node to another. The priority of a transmission is the priority of the transmit queue at the source OptSw.

Figure 6:
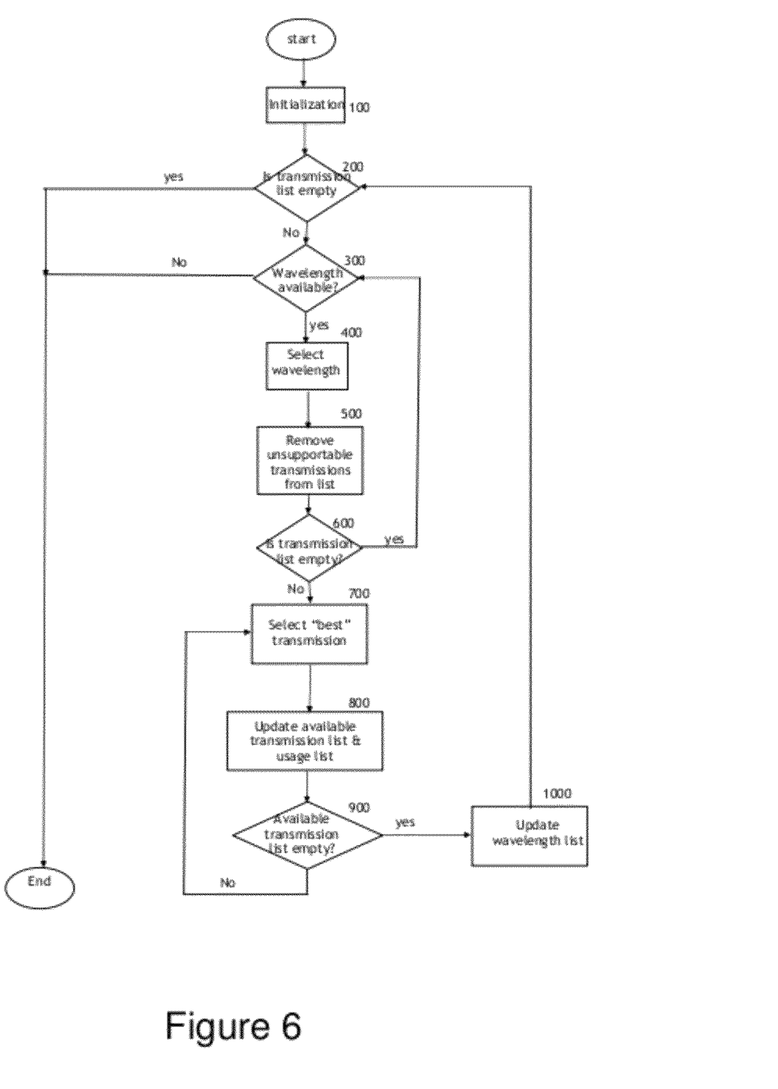
FIG. 6 is an illustrative flow chart of example logic for scheduling at the central server according to one embodiment.

One embodiment of the scheduling methodology performed by a central scheduler is illustrated in FIG. 6. To simplify the description, assume that the scheduling method will be executed every k msec, and when a transmission is granted to a OptSw, the node will transmit at most k msec. In this manner, when the method executes the next time, it is a fresh start (i.e., all wavelengths are free of transmissions). How this constraint may be relaxed is described at a later paragraph.

At step 100, the methodology begins by initializing a list of available wavelengths, a usage list for particular wavelengths, and a list of transmission candidates. The list of available wavelength contains the identity of all the wavelengths that can still support new assignment for transmissions. Initially, all the wavelengths are available for use. The usage list for particular wavelengths includes, for each available wavelength, a list that details the arc segments of the ring, for that particular wavelength, that have been committed to support transmission/s. Initially, for each wavelength, the entire ring is available. The list of transmission candidates is initialized to include all pending transmissions, which information is obtained from the information obtained from the OptSws concerning their queues.

At step 200, it is determined whether the transmission list of all candidate transmissions is empty or not. If the list is empty, the method terminates. If the list is not empty, the method proceeds to step 300.

At step 300, it is determined, from the available wavelength list, whether wavelengths are still available. If no wavelengths are available, the method terminates. If one or more wavelengths are available, one wavelength is selected at step 400 for further consideration of its scheduling.

At step 500, nodes that cannot transmit or receive transmissions due to lack of resource are identified. Removed from the candidate transmission list are the transmissions where, due to conflict: 1) the receiving node of the transmission cannot receive for the selected λ; and 2) the transmitting node of the transmission cannot transmit for the selected λ.

At step 600, after the unsupportable transmissions have been removing from the list of transmission candidates, the list is checked to determine if it is empty. If the list is empty, the method goes to step 400 to attempt to select another wavelength. If the list is not empty, the method proceeds to step 700.

At step 700, a 'best' transmission is selected. However, before describing the procedure on selecting a transmission from the transmission list, the concept of the residue set of a transmission will be described. Consider a set of transmission S with members t1, t2, t3, . . . . Presume that transmission t1 is selected. Once t1 is selected, a segment of the ring is committed to support this transmission. As a result of this commitment, for this particular wavelength, the network would not be able to support some of the remaining transmissions t2, t3, t4, . . . Remove these un-supportable transmissions. The remaining transmission/s in the set after the removal of these transmissions is referred to as the residue set for t1. Consider for example, the ring network in FIG. 6 which consists of eight OptSws, nodes 100 to 170. In this example, there are six transmissions in the set of transmission S:

t1: from node 100 to node 120
t2: from node 110 to node 130
t3: from node 120 to node 140
t4: from node 140 to node 150
t5: from node 140 to node 160
t6: from node 170 to node 100

Once t1 is selected, t2 can not be supported but the other transmission can be supported. Thus, the residue set for t1 is t3, t4, t5, and t6. Similarly, once t2 is selected, only t1 can not be supported and the residual set for t2 is t4, t5, t6, while the residue set for t6 is t1, t2, t3, t4, and t5.

In an embodiment employing priority, the "k-residue" set of a transmission consists of all the members of the residue set of that transmission which are of priority k.

Thus, at step 700, a first or 'best' transmission is selected from the available transmission list as follows:

First, consider the set of transmissions in the available transmission lists that have the same priority. Let the level be k. For example, the level k may correspond to the highest priority level. If priority is not utilized, all transmissions are the same level.

If there is only one such transmission in the available transmission lists at priority level k, select that transmission as 'best'. If there is more than one transmission with priority level k, then select the transmission with largest k-residue set as 'best'. If there remains a tie (i.e., multiple transmission with same size k-residue set), select the transmission with the longest path as 'best'. If there still remains a tie, randomly select one of the tied transmissions as 'best'.

The method process to step 800, where after a transmission was selected as first or 'best' by step 700, the residue set for the selected transmission is utilized. In particular, the current candidate transmission list is replaced by this residue set. In addition, the usage list is updated by adding the selected transmission to that list.

Then, at step 900, it is determined whether the newly updated available transmission list (i.e., pending transmissions) is empty or not. If the newly updated available transmission list is not empty, the method proceeds to step 700 to select another transmission. When the list is empty, this means that this wavelength could not support more transmission and the method proceeds to step 1000.

At step 1000, the wavelength list is updated by removing the current wavelength from the list and then proceeds back to step 200 at which point the transmission list is re-initialized to include all remaining unselected transmissions.

If at step 200, the transmission list is empty, the method terminates. If at step 300, no wavelength is available, the method terminates. From the usage list of each wavelength, the scheduler can determine the transmissions that should occur for a subsequent transmission cycle, such as the next transmission cycle.

There are many variations to the above method. For example, in step 500, when there are multiple transmissions of equal highest priority, instead of choosing the transmission with the largest k-residue, the transmissions with shortest path may be chosen instead. While a method employing the shortest path would be less optimal than one employing selection of the largest k-residue, its execution would be less complex and faster.

The above description assumes that each decision cycle begins with a fresh start. This assumption can be removed by the following modification. When initializing the usage list in step 100, transmissions in progress may be added to the initial usage list for each wavelength.

The above description also assumes that all the OptSws in the ring network have tunable transmitters. If some of the nodes in the network have fixed transmitters, say at $\lambda 1$, the algorithm may be modified as follows. When selecting wavelengths in step 100, wavelengths that are not tied to fixed transmitters are selected first. Wavelengths that are associated with fixed transmitters are selected last.

For each node, there is a transmission queue that supports broadcast traffic. The path of this transmission will span all the nodes of the network. For example, with reference to FIG. 6, the transmission path to support broadcast traffic may span from node 100 to node 120, to node 130, . . . , and ends at node 170. After selecting this transmission to support broadcast traffic, the corresponding wavelength can still support a transmission from node 170 to node 100.

Note that the network will have wavelengths transmitting via the ring in both directions (e.g., clockwise and counterclockwise). Therefore, to be bandwidth efficient, the method may only consider transmissions that are always no greater than a half ring. In that case, the relative position of the source node to the receiving node will determine the direction of the transmission in order to limit the number of nodes traversed.

Note that, by selecting transmissions with largest k-residue, the method enables preferable simultaneous transmissions, resulting in good space reuse.

The above described method determines the circuit mode transmissions to be activated at a given cycle. In addition to circuit mode transmission directly between two nodes, an OptSw may also transmit packets using the packet forwarding module. The scheduling of packet transmission may be executed at the local level (e.g., determined by the OptSw). Such packet transmission scheduling may include that packets at the broadcast queue 115 have precedent over unicast packets with known egress OptSw (i.e. those queued at queues 130s). Further, at each node, the amount of packets that can be sent may be limited by a rate limiter. Furthermore, packets at the broadcast queue may be given higher priority as it is more difficult to set up circuit mode broadcast (i.e., a transmission that spans almost the entire ring). In one embodiment, the number of wavelengths committed to support the packet forwarding network depends on the traffic characteristics of the network.

OptSws are connected to the central scheduler via a control network. Note that the central server is a logical module that may be realized as an independent physical unit (e.g., specially programmed computer) or as part of an OptSw. In the latter case, a number of embodiments are possible. For example, in one embodiment, the software that supports the central scheduler may be administratively configured. In another embodiment, each OptSw may include a central scheduler. During the ring initializing process, one node may be elected to serve as the active central scheduler. Such an election process is a well known prior art in the industry (e.g., the OptSw with the highest node ID will be elected).

A central server based scheduling method that optimizes space reuse is described herein. The methodology is independent of the implementation of the control network. That is; the only requirement is that the control network must have enough capacity so that, an OptSw can report its queue status to the central server at a timely basis and the central server can send commands to each OptSw to activate and deactivate transmitters, receivers, and blocking modules at a timely basis.

In the simplest embodiment, the central scheduler is an independent physical unit, such as a computer comprising a processor and memory, with direct link to each OptSw. This link/s (e.g., connection) will be used by the central scheduler to collect parameters of the queues as described previously, at regular intervals from the OptSw and/or on demand. The link will also be used to send command instructions to the OptSws to activate and deactivate circuit mode transmissions.

In one embodiment, in order to activate a transmission, the central scheduler:

first sends a command to the receiving node activate the receiver; and upon the receipt of a positive acknowledgement from the receiver, sends a command to the transmitting node to activate the transmitter, which would respond to the central scheduler with an acknowledgement.

In another embodiment, the central scheduler to send commands to both the transmitting node and the receiving node simultaneously. While typically resulting in faster operation, this approach runs a slight risk that the transmitter may transmit before the receiver is ready to receive.

If the independent central scheduler is connected to a network that also connects all the OptSws, then in another embodiment is, the central scheduler sends a command to the receiving node; the receiving node sends the command to the transmitting node; and the transmitting node sends an acknowledgement to the scheduler. Other variations will be apparent to those skilled in the art.

If the central scheduler resides at one of the OptSws, one or more wavelengths may be used to support the control network. In one embodiment, two wavelengths, one in each direction, are used to support the control network and transport control messages. For this control network, the optical signal will be demodulated at each hop and processed by the OptSw. Control messages may include the transmission set up messages, transmission termination messages, queue statistics collection messages.

A transmission set up message is used to set up the transmissions of a particular wavelength. For example, assume that, for a particular OptSw ring network, wavelengths $\lambda 1, \lambda 3, \lambda 5, \ldots$ are transmitting in the clockwise direction, while wavelengths $\lambda 2, \lambda 4, \lambda 6, \ldots$ are transmitting in the counter-clockwise direction. The setup messages for $\lambda 1, \lambda 3$, etc. may be transmitted in the counter-clockwise direction, opposite to the direction of information flow.

Figure 7:
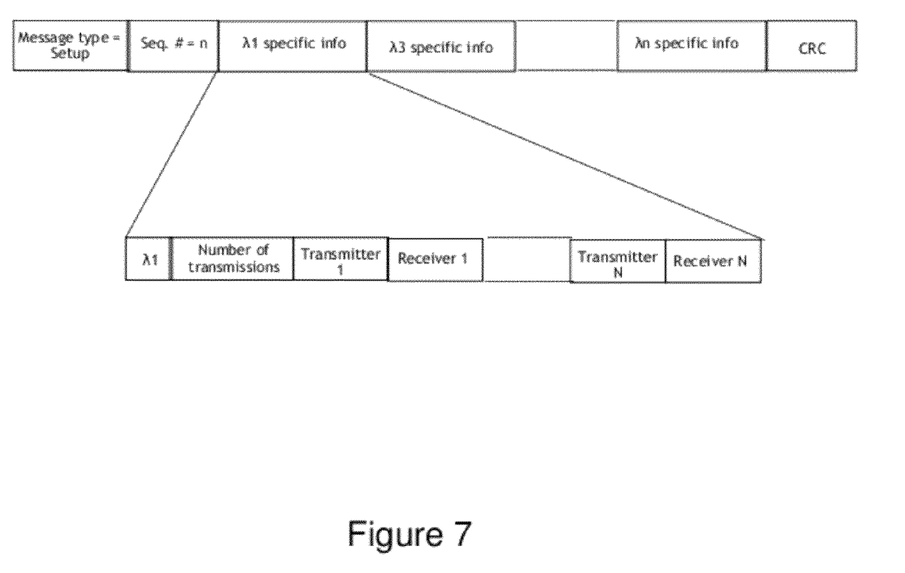
FIG. 7 is an illustrative example of format for a Transmission Set-up message.

One embodiment of the setup message is illustrated in FIG. 7. The message includes the following information:

Message type: This field indicates that the message is a transmission set up messages.

Sequence number.

Wavelength Specific Information: For each applicable wavelength, the transmissions that would be setup for this cycle. In the example as illustrated in FIG. 7, the wavelength specific information is encoded as follows: (a) the number of transmissions for this cycle, and (b) the ID of the transmitter and receiver for transmission.

Error Detection Code: An error detection code, for example a CRC, that is used to detect errors in transmission. For better performance, a FRC (forward error correction code) can be used to correct errors instead of a CRC.

The setup message may be sent in the opposite direction of data traffic to ensure that the receiver of a transmission receives the setup message before the transmitter. This way the receiver can prepare itself to receive the transmission from the transmitter.

An example procedure for a setup message is as follows. When the OptSw that houses the central scheduler decides to set up the transmissions for the wavelengths, it will send this message to its next neighbor OptSw in the direction opposite to the direction of the transmissions. To protect against errors, the setup message will be sent N times (e.g., usually 3 times). When an OptSw receives this message, the receiving OptSw will determine, through the sequence number, whether it has processed this message before or not. If the message has already been processed, the OptSw would forward this message to the next node. If the message is received for the first time, the OptSw will read the message and perform the one or more of the following actions If the setup message indicates that the OptSw is a transmitter for a wavelength, the OptSw will (a) activate the blocking module for that particular wavelength, (b) start transmitting packets that are destined to the OptSw indicated as the receiver over the particular wavelength, and (c) forward the message to the next hop.

If the setup message indicates that the OptSs is a receiver for a wavelength, the OptSw will prepare itself to receive transmissions for the particular wavelength. The OptSw will also note the identity of the transmitting OptSw. The ID of the transmitter will be used in the learning process as described previously. The OptSw will also forward the packet to the next hop.

If the setup messages indicates that the OptSw is neither a transmitter nor a receiver, the OptSw ensures the blocking module is not blocking the particular wavelength and forwards the message to the next hop.

The central scheduler OptSw may eventually receive the setup message back from its other neighbor. In that case, the message will be discarded.

A transmission termination message is used to terminate transmissions, individually or in groups. The transmission termination message may be sent in the same direction as transmissions. In this manner, transmitters will receive this message before the receivers, ensuring graceful termination. In one embodiment, the transmission termination message will have the same message format as the setup message (with the exception that the message type field would indicate that it is a termination message). The "number of transmission" field can be encoded with a special value to indicate "all transmissions". Given this special value in the 'number of transmissions' field, the IDs of transmitters and receivers would not be needed as the message is understood to apply to all transmissions. Upon the receipt of the transmission termination message, transmitters as indicated in the message would stop transmitting over the indicated wavelength. The blocking module would also ensure that that particular wavelength is unblocked. The OptSw also forwards this message to the next node. When a receiver receives this message, it would de-allocating its resources for the indicated transmission and forwards this message to the next hop. Processing is necessary at pass-through nodes. The node would forward the message to the next hop.

A queue statistics collection (QSC) message is used by the central scheduler OptSw to collect queue statistics from the rest of the OptSws. The QSC message may includes the following information:

Message type: This field would be encoded to indicate the message is a QSC message.

Sequence number.

Error detection and/or forward error correction code.

Figure 8A:
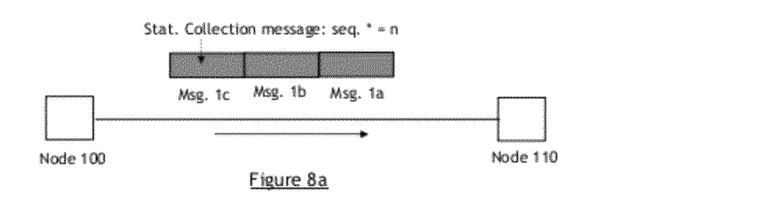
FIG. 8 is an illustrative example for an embodiment of the queue statistics collection process.
Figure 8B:
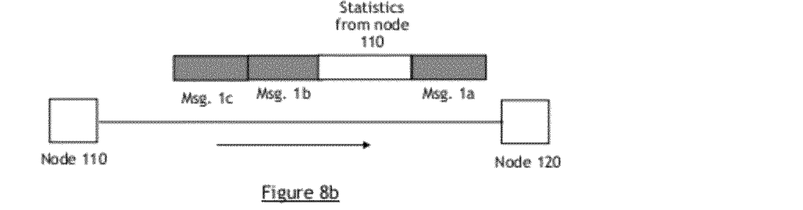

A QSC message may be able to be sent in either direction. The procedure is best illustrated by an example, such as the example procedure illustrated in FIG. 8. Consider the network in FIG. 4, with the central scheduler resident in OptSw node 100. Node 100 will send a QSC message three times to next node 110, indicated as message 1*a*, 1*b*, and 1*c* in FIG. 8*a*. When node 110 receives a QSC message, node 110 determines, based on the sequence number, whether it has already responded to this QSC message or not. If it has already responded, node 110 would forward the message to its next node, node 120. If this is the first time that node 110 receives this QSC message, node 110 will forward the QSC message to its next node, node 120. Node 110 then sends its queue statistics, encoded as a separate message (queue statistics response (QSR) message), following the QSC message. This portion of the process is illustrated in FIG. 8*b*. The above procedure would be repeated at every node in the ring.

Figure 8C:
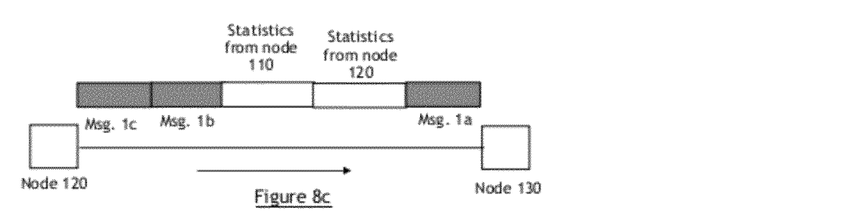
Figure 8D:
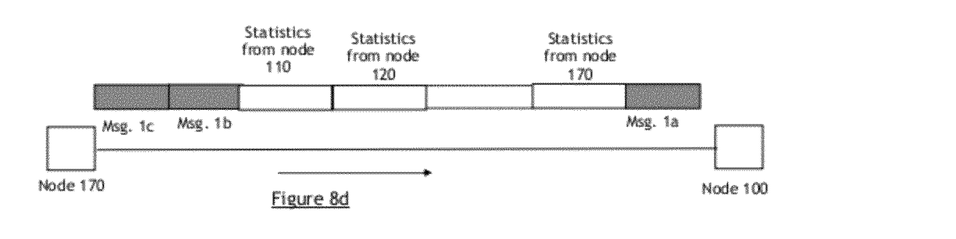

FIG. 8*c* illustrates the collection of QSR messages between node 120 and 130. Eventually, node 170 will forward the collection of QSR messages, from node 170, 160, . . . , and 110, back to node 100, as illustrated in FIG. 8*d*. Through this process the central schedule collect all the queue statistics from all the nodes.

In one embodiment, QSC messages are sent in one a single direction, However, since the QSC message may be sent in either direction, one may want to load balance the traffic load. Therefore, in one embodiment, the central scheduler OptSw will send QSC in both directions. Then, when reporting queue statistics, a node would only report the queue statistics for half of nodes for either direction. For example, node 110 would only report statistics for its queues to node 120, 130, 140, 150 in response to QSC message one direction, and for nodes 160, 170, 100, and the broadcast queue in response to QSC message in the other direction.

In the above description, it is assumed that two wavelengths are assigned to support control message. A more cost effective implementation uses the already existing packet switch module in the OptSw to transfer these control messages (e.g., setup, termination, and QSC). As these control messages are time critical messages, they may be assigned with priority that is higher than other traffic, and may be forwarded ahead of all other traffic that is waiting in queues. However, since it is preferable to not disrupt the transmission of a packet that is in progress, some queuing delay may occur at each node. With current technology, the wavelengths usually operate at 10 Gbps or above. The maximum Ethernet frame is less than 1600 octets (or ~10,000 bits). Therefore, the maximum delay incurred at a node is at most 1 micro-second and its impact is minimal.

While this invention has been described with reference to illustrative embodiments, this description is not intended to be construed in a limiting sense. For example, in the above description, the method uses three parameters (1. current buffer size; 2. head of queue packet delay, and 3. estimated time of buffer overflow) as the basis to determine the priority of a transmission. Depending of the network and the traffic pattern of the network, some of the parameters may not be used or replaced by other parameters instead. For instance, thresholds for the parameters for queue status may be set up at each OptSw administratively and therefore, instead of reporting the exact value of a parameter, an OptSw may only report the current threshold value of the parameter instead.

For example, the method described above operates in cycles. For simplicity, all the OptSws report information to the scheduling server during a cycle. Based on the information reported, the scheduling server determines the transmissions that will take place during a subsequent cycle such as the next cycle. In other embodiments, a transmission may be broken down into mini-cycles. Accordingly, the scheduling server determines transmissions that will take place for mini-cycles based on the information reported from the OptSws from a previous cycle. A transmission between two nodes may also span multiple mini-cycles. By breaking down the transmission cycle into mini-cycles, additional flexibility may be achieved and OptSws may be able to report information to the central server less often.

In another embodiment, the scheduler may instruct a plurality of OptSw 100, 110, 120, . . . 170 to transmit or receive on the same one or more wavelengths. For example, with reference to FIG. 3, initially a first OptSw (e.g., OptSw 110) may be assigned the privilege to transmit to a fifth OptSw (e.g., OptSw 150) with second, third and fourth OptSw (e.g., OptSw 120, 130, and 140) intermediate therebetween on the optical ring scheduled to operate in pass through mode. In some instances, there will be very light traffic between the first OptSw and the fifth OptSw. For example, the first OptSw may have only five packets to transmit to the fifth OptSw while ten packets may be transmitted per cycle. Accordingly, in these instances, in addition to instructing first OptSw to transmit to the fifth OptSw, the central scheduler may also instruct the first OptSw to transmit to other intermediate OptSw/s (e.g., OptSw 130).

For example, this type of scheduling for transmission of packets on a single wavelength by one node to be received at multiple nodes at may be accomplished by sending command instructions:

to the originating OptSw (e.g., the first OptSw) to send packets to one or more intermediate OptSw (e.g., the third OptSw) and a terminating OptSw (e.g., the fifth OptSws;

to the terminating OptSw to receive packets and act as a terminating node; and to the intermediate OptSw/s to receive packets and also act as a passthrough node.

As instructed by the central scheduler, the intermediate and terminating OptSws will demodulate the optical signal in order to receive packets (note this assumes that the intermediate OptSws has an available demodulator). Based on the destination address in the packet header, the intermediate and terminating OptSws can determine whether any particular packet is destined for it. Also, the intermediate OptSw/s will permit the optical signal to pass though its blocking module and the terminating OptSw will block the optical signal from passing through its blocking module as instructed by the central scheduler. Thus, the scheduler could instruct the terminating node to transmit to another downstream node (e.g., OptSw 170) using the same wavelength. While this embodiment adds complexity to the system, it allows for more efficient use of bandwidth within a cycle.

Embodiments of present invention may be implemented as circuit-based processes, including possible implementation on a single integrated circuit.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the following method claims, if any, recite steps in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor/s to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", "controllers" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "module" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of What the claimed is:

1. A method of scheduling an optical network, the method comprising:
   receiving at a scheduling server status information concerning at least one transmit queue for a plurality of optical pass-through switches (OptSws);
   determining a schedule for one or more transmissions to take place in a cycle based on the status information for the plurality of OptSws, the determining including:
      for a wavelength that is available to transmit a transmission,
         removing one or more unsupportable transmissions from a candidate transmission list,
         determining a first transmission of the candidate transmission list, the first transmission being the one of the transmissions of the candidate transmission list which most preferably satisfies a given parameter;
         updating a usage list to reflect determination of the first transmission; and
         replacing the candidate transmission list with the residue set of the first transmission; and
      forwarding a control message to the plurality of OptSws in order that the schedule may be implemented at the plurality of OptSws.

2. The method of claim 1 wherein the status information includes an indication of at least one parameter from the group consisting of current buffer size of a transmit queue, head of queue packet delay for a transmit queue, and an estimated time of buffer overflow for a transmit queue.

3. The method of claim 2 wherein the indication details a relationship of the parameter to one or more thresholds.

4. The method of claim 1 wherein the status information includes an identification of an egress OptSw for a queued transmission.

5. The method of claim 1 wherein the control message is at least one of a transmission setup message, transmission termination message, and queue statistics collection message.

6. The method of claim 1 wherein the control message is a transmission setup message, the transmission setup message including wavelength specific information that informs establishment of a direct optical path from a first OptSw to an second OptSw.

7. The method of claim 1 wherein the control message includes an indication for at one of the plurality of OptSws to perform at least one of: disabling a transmitter, enabling a transmitter, disabling a receiver, enabling a receiver, disabling a blocking module, enabling a blocking module.

8. The method of claim 1 wherein forwarding the control message to the plurality of OptSws in order that the schedule may be implemented at the plurality of OptSws comprises:
   forwarding the control message based on the usage list.

9. The method of claim 1 wherein the given parameter is largest residue set, largest k-residue set, shortest path, or shortest k-path, and the first transmission correspondingly has a largest residue set, a largest k-residue set, a shortest path, or a shortest k-path for the transmissions of the candidate transmission list.

10. The method of claim 1 wherein the first transmission is
   a transmission having a longest path when two or more of the transmissions of the candidate transmission list have a same size residue set; and
   when two or more of the transmissions of the candidate transmission list have a same size residue set and a same size path, a selected one of the two or more transmissions.

11. The method of claim 1 wherein determining the schedule for one or more transmissions to take place in a next cycle based on the status information for the plurality of OptSws further comprises:
   determining an intermediate OptSw that may tap into the first transmission on the wavelength; and
   determining an originating OptSw of the first transmission on the wavelength that may transmit to an intermediate OptSw and a terminating OptSw.

12. An apparatus for scheduling an optical network, the apparatus including a processor and a memory device, the processor configure to:
   receive status information concerning at least one transmit queue for a plurality of optical pass-through switches (OptSws);
   determine a schedule for one or more transmissions to take place in a cycle based on the status information for the plurality of OptSws, the determining including:
      for a wavelength that is available to transmit a transmission,
         removing one or more unsupportable transmissions from a candidate transmission list,
         determining a first transmission of the candidate transmission list, the first transmission being the one of the transmissions of the candidate transmission list which most preferably satisfies a given parameter;
         updating a usage list to reflect determination of the first transmission; and
         replacing the candidate transmission list with the residue set of the first transmission; and
   forward a control message to the plurality of OptSws in order that the schedule may be implemented.

13. The apparatus of claim 12 wherein the status information includes an indication of a parameter from the group consisting of current buffer size of a transmit queue, head of queue packet delay for a transmit queue, and an estimated time of buffer overflow for a transmit queue.

14. The apparatus of claim 13 wherein the indication details a relationship of the parameter to one or more thresholds.

15. The apparatus of claim 12 wherein the status information includes an identification of one or more egress OptSws for a queued transmission.

16. The apparatus of claim 12 wherein the control message is at least one of a transmission setup message, transmission termination message, and queue statistics collection message.

17. The apparatus of claim 12 wherein the control message is a transmission setup message, the transmission setup message including wavelength specific information that informs establishment of a direct optical path from a first OptSw to an second OptSw.

18. The apparatus of claim 12 wherein the control message includes an indication for at one of the plurality of OptSws to perform at least one of: disabling a transmitter, enabling a transmitter, disabling a receiver, enabling a receiver, disabling a blocking module, enabling a blocking module.

19. The apparatus of claim 12 wherein forwarding the control message to the plurality of OptSws in order that the schedule may be implemented at the plurality of OptSws comprises:
forwarding the control message based on the usage list.

20. The apparatus of claim 12 wherein the given parameter is largest residue set, largest k-residue set, shortest path, or shortest k-path, and the first transmission correspondingly has a largest residue set, a largest k-residue set, a shortest path, or a shortest k-path for the transmissions of the candidate transmission list.

21. The apparatus of claim 12 wherein the first transmission is
a transmission having a longest path when two or more of the transmissions of the candidate transmission list have a same size residue set; and
when two or more of the transmissions of the candidate transmission list have a same size residue set and a same size path, a selected one of the two or more transmissions.

22. The apparatus of claim 12 further comprising
a blocking module, for blocking a wavelength from passing through the apparatus;
add module for adding a wavelength to a signal exiting the apparatus;
drop module for directing a wavelength from a signal entering the apparatus to further processing.

* * * * *